United States Patent
Clodfelter et al.

(10) Patent No.: US 8,040,272 B1
(45) Date of Patent: Oct. 18, 2011

(54) LEADING AND LAGGING APERTURE FOR LINEAR GROUND PENETRATING RADAR ARRAY

(75) Inventors: James F. Clodfelter, Haymarket, VA (US); Mark W. Hibbard, Arlington, VA (US)

(73) Assignee: Niitek Inc., Sterling, VA (US)

( * ) Notice: Subject to any disclaimer, the term of this patent is extended or adjusted under 35 U.S.C. 154(b) by 0 days.

(21) Appl. No.: 12/148,677

(22) Filed: Apr. 21, 2008

Related U.S. Application Data

(60) Provisional application No. 60/925,194, filed on Apr. 20, 2007.

(51) Int. Cl.
*G01S 13/00* (2006.01)
(52) U.S. Cl. .............. 342/22; 342/59; 342/159
(58) Field of Classification Search .............. 342/22
See application file for complete search history.

(56) References Cited

U.S. PATENT DOCUMENTS

| | | | |
|---|---|---|---|
| 4,103,302 A * | 7/1978 | Roeder et al. | 342/113 |
| 4,965,582 A * | 10/1990 | Hellsten | 342/25 A |
| 5,075,772 A * | 12/1991 | Gebel | 348/135 |
| 5,189,424 A * | 2/1993 | Brown | 342/25 C |
| 5,337,289 A * | 8/1994 | Fasching et al. | 367/140 |
| 5,553,407 A | 9/1996 | Stump | |
| 5,659,985 A | 8/1997 | Stump | |
| 5,704,142 A | 1/1998 | Stump | |
| 5,867,117 A | 2/1999 | Gogineni et al. | |
| 6,119,376 A | 9/2000 | Stump | |
| 6,195,922 B1 | 3/2001 | Stump | |
| 6,225,941 B1 | 5/2001 | Gogineni et al. | |
| 6,333,631 B1 * | 12/2001 | Das et al. | 324/326 |
| 6,445,334 B1 | 9/2002 | Bradley et al. | |
| 6,477,795 B1 | 11/2002 | Stump | |
| 6,590,519 B2 | 7/2003 | Miceli et al. | |
| 6,690,617 B2 | 2/2004 | Cribbs | |
| 6,700,526 B2 | 3/2004 | Witten | |
| 6,701,647 B2 | 3/2004 | Stump | |
| 6,751,553 B2 | 6/2004 | Young et al. | |
| 6,766,253 B2 | 7/2004 | Burns et al. | |
| 6,771,206 B2 | 8/2004 | Berthelier et al. | |
| 6,838,671 B2 | 1/2005 | Compana et al. | |
| 6,864,826 B1 | 3/2005 | Stove | |
| 6,969,844 B2 | 11/2005 | Albats, Jr. et al. | |
| 6,975,942 B2 * | 12/2005 | Young et al. | 702/5 |
| 7,034,740 B2 | 4/2006 | Witten | |
| 7,482,970 B2 * | 1/2009 | Buck | 342/25 A |
| 2003/0090406 A1 * | 5/2003 | Longstaff et al. | 342/22 |
| 2003/0193429 A1 * | 10/2003 | Campana et al. | 342/22 |
| 2004/0199150 A1 * | 10/2004 | Lai | 606/5 |
| 2005/0024257 A1 * | 2/2005 | Britton et al. | 342/70 |
| 2005/0192726 A1 * | 9/2005 | Okura et al. | 701/36 |
| 2006/0085133 A1 | 4/2006 | Young et al. | |
| 2006/0087471 A1 * | 4/2006 | Hintz | 342/22 |
| 2006/0271298 A1 * | 11/2006 | MacIntosh et al. | 702/5 |

* cited by examiner

*Primary Examiner* — Thomas Tarcza
*Assistant Examiner* — Timothy Brainard
(74) *Attorney, Agent, or Firm* — James Creighton Wray

(57) ABSTRACT

A radar array linearly traverses an area of ground. Additional radar elements fore and aft of the array detect changes in elevation and orientation of the array. These elements act as a preview for the height changes due to ground variation. Any variation in height that is not detected by these fore and aft-mounted elements is thus due to variation in radar elevation and/or orientation and can be subtracted from the resulting data without introducing distortion. Correction factors are applied to the range data returned from each element in the array, which normalizes the data and makes it appear as if the array did not change orientation or elevation.

20 Claims, 3 Drawing Sheets

LEADING AND LAGGING APERTURE FOR LINEAR GROUND PENETRATING RADAR ARRAY

This application claims the benefit of U.S. Provisional Application No. 60/925,194, filed Apr. 20, 2007, which is hereby incorporated by reference in its entirety.

TECHNICAL FIELD OF THE INVENTION

The present invention relates to the field of sensor arrays, height control, surface contour mapping, mine detection, vehicle-based non intrusive inspection, and explosive hazards detection.

BACKGROUND OF THE INVENTION

In the prior art, a linear ground penetrating radar array (GPR) is swept across an area of ground. The GPR gathers data from each element of the array periodically as it traverses the ground. The traversed motion is usually achieved by rigidly mounting the array to a vehicle or cart. The GPR is kept at some nominal height from the ground. Data collected from each element as it traverses the ground is used to create a 3-dimensional image of the ground surface and the anomalies beneath the ground surface. The delay time of each of the reflections occurring in each data element corresponds to a distance from the corresponding antenna element.

As the array is traversed over the ground, each radar antenna element is activated, yielding a one-dimensional A-scan. When all radar elements in the linear array are activated, a 2-dimensional image of the ground under the array can be recreated, yielding a radar B-scan. As the array is moved, B-scans are collected in some uniform manner, often based on the array moving some fixed distance. This yields a 3-dimensional data cube. It is desirable to move the array in a linear manner over the ground in order to avoid distorting the image of any sub-surface anomalies. However, the dynamics of the vehicle carrying the linear GPR array can preclude such a linear collection. Vehicle dynamics can introduce height variations and cause the absolute elevation of the array elements to vary from one B-scan to the next. In order to avoid distortion in the resulting image and to accurately map the contour of the ground, it is desirable to correct for these variations.

One possible correction is to detect the location of the ground and compensate for any elevation variation in the GPR array by aligning the ground reflections from one B-scan to the next. This method of compensation operates on the assumption that the ground is flat. Any variations in the ground surface elevation results in corresponding distortions in the image of any subsurface anomaly. Often over uneven ground it is desirable to obtain an accurate un-distorted image of the anomaly in order to identify and characterize it. If height changes due to radar elevation and height changes due to ground elevation variation can be differentiated, compensation can be applied to the resulting data cubes which will minimize distortion of the image. Accurate inertial navigation systems (INS) or differential GPS systems may accomplish similar objectives. However, INS and GPS systems can drastically increase the total cost of a system.

Needs exist for an improved method for detecting elevation changes of a radar array and for differentiating between height changes due to radar elevation and height changes due to ground elevation variation.

SUMMARY OF THE INVENTION

This invention is an improved method for detecting elevation changes of a radar array and differentiating between height changes due to radar elevation and height changes due to ground elevation variation. With this additional data, compensation can be applied to the data cubes resulting from the linear traversal of a radar array over an area of ground, which will minimize distortion of the image. This invention will improve mapping of terrain, accurate sub-surface visualization, and non-intrusive inspection of objects and would be particularly useful in archeological, agricultural, construction, and defense applications.

The invention is the addition of radar elements fore and aft of a linear array and the use of these additional radar elements to detect changes in elevation and orientation of the array. These elements act as a preview for the height changes due to ground variation. Any variation in height that is not detected by these fore and aft-mounted elements is thus due to variation in GPR elevation and/or orientation and can be subtracted from the resulting data without introducing distortion.

A new ground contour mapping array has a movable structure, an array of sensor elements attached to the movable structure, and additional sensor elements fore and aft of the array for detecting changes in elevation and orientation of the array to prevent distortion of data gathered by the array. The array of sensor elements may be a linear array or a planar array. The array of sensor elements may be an array of ground penetrating radar elements, each consisting of a transmitter and receiver pair. In one embodiment, the additional sensor elements are LADAR or ultrasound. In another embodiment, the additional sensor elements are ground penetrating radar elements, each consisting of a transmitter and receiver pair.

The additional sensor elements may be placed fore and aft of end sensor elements of the array that are first and last in a direction perpendicular to a direction of motion. In one embodiment, the new ground contour mapping array also has a processor and a memory operatively coupled to the processor. The processor adjusts the data gathered by the array according to the changes in elevation and orientation detected with the additional sensor elements and the memory records the adjusted data. The sensor elements of the array of sensor elements are mounted rigidly with respect to one another, such that the distance between them is always the same.

In a new method of mapping ground contours, a movable structure is provided. First sensor elements are also provided in an array attached to the movable structure and second sensor elements are provided fore and aft of the array. The movable structure is linearly traversed over an area of ground and data is gathered periodically from the first sensor elements while the movable structure traverses the area of ground. Distances are detected between the second sensor elements and the ground at the same time as data is gathered from the first sensor elements. A change in elevation and orientation of the first sensor elements is determined based on data gathered by the first sensor elements and distances detected by the second sensor elements. The data gathered from the first sensor elements is normalized to remove the effect of changes in the elevation or orientation of the first sensor elements. The normalized data is stored and a 3-dimensional image of a ground surface is created using the normalized data.

In one embodiment, the second sensor elements fore and aft of the array are provided fore and aft of end first sensor elements that are first and last in a direction perpendicular to a direction of motion. In one embodiment, the change in elevation and orientation of the first sensor elements is determined due to changes in the array and not due to ground variation, based on the distance between the end first sensor elements and the ground and the distance between each of the second sensor elements to their fore and aft and the ground at the present position and at least one previous position. The change in elevation of the first sensor elements other than the end first sensor elements due to changes in the array and not due to ground variation is determined by taking a linear combination of the changes in elevation of each of the end first sensor elements due to changes in the array and not due to ground variation. The distance between the end first sensor elements and the ground and the distance between each of the second sensor elements and the ground at least one previous position may be normalized to remove the effect of changes in the elevation or orientation of the first and second sensor elements at the previous position.

Determining the change in elevation of the end first sensor elements due to changes in the first sensor elements and not due to ground variation can be carried out by comparing a distance measured between a first or second sensor element and the ground and a distance measured between another first or second sensor element and the ground, where the first or second sensor element and the another first or second sensor element were each above the same location on the ground when the measurements were taken.

In one embodiment, the data is gathered periodically by gathering data from the first sensor elements each time the movable structure traverses a distance equal to a given percentage of the distance between the end first sensor elements and the second sensor elements fore and aft of the end first sensor elements. The given percentage may be 100%.

In one embodiment, the first or second sensor elements are ground penetrating radar elements, each consisting of a transmitter and receiver pair. The first and second sensor elements may be mounted rigidly with respect to one another, such that the distance between them is always the same.

These and further and other objects and features of the invention are apparent in the disclosure, which includes the above and ongoing written specification, with the drawings.

DETAILED DESCRIPTION OF THE INVENTION

As in prior art, a linear ground penetrating radar array (GPR) is rigidly mounted to a vehicle or cart and swept in a linear manner across an area of ground, gathering data periodically from each element of the array. The data collected is used to create a 3-dimensional image of the ground surface and the anomalies beneath the ground surface. The delay time of each of the reflections occurring in each data element correspond to a distance from the corresponding antenna element.

As the array is traversed over the ground, each radar antenna element is activated, yielding a one-dimensional A-scan. When all radar elements in the linear array are activated, a 2-dimensional image of the ground under the array can be recreated, yielding a radar B-scan. As the array is moved, B-scans are collected in some uniform manner, yielding a 3-dimensional data cube.

A coordinate system is defined in reference to a linear array and its motion. The dimension along which the linear array is being traversed is "down-track." The linear array is perpendicular to this direction, or "cross-track." The third dimension in the coordinate system is elevation. At each down-track location, the distance measure from each fore, middle, and aft element of the array to the ground can be compared to previous distances. Any changes in elevation and orientation of the array can be subtracted out.

Figure 1:
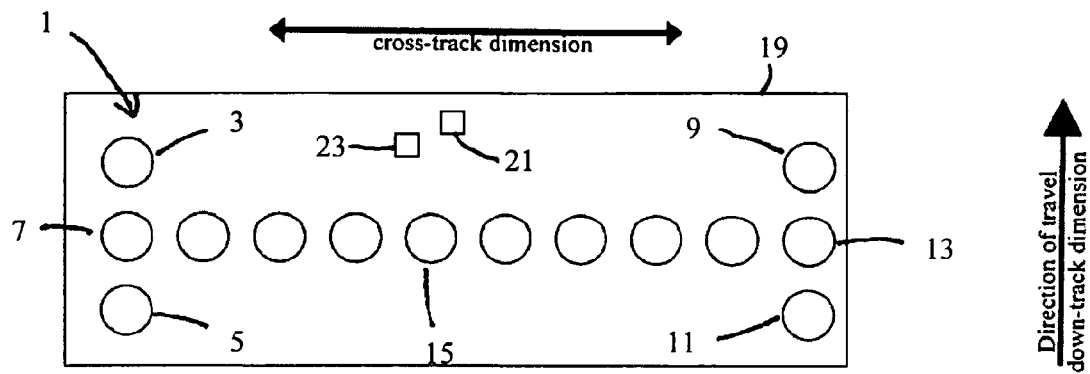
FIG. 1 is a plan view of a possible layout of the invention.

A plan view of a possible layout of the invention is shown in FIG. 1.

Each radar element in the radar array 1 is defined as a transmitter and receiver pair. Each element is represented by a circle in the diagram. Each element is capable of detecting its distance from the ground below it. Fore and aft elements 3, 5 are on the left side of the linear array. These elements detect changes in the elevation and orientation of end element 7. Since the right side of the linear array can vary in elevation and orientation somewhat independently of the left side, elements 9 and 11 are necessary to detect changes in the elevation and orientation of element 13. The orientations and elevations of the elements in between 7 and 13 (for example element 15) can be calculated by taking a linear combination of the corrections for 7 and 13. The elements are mounted on a movable structure 19. The system may include a processor 21 and memory 23.

Figure 2:
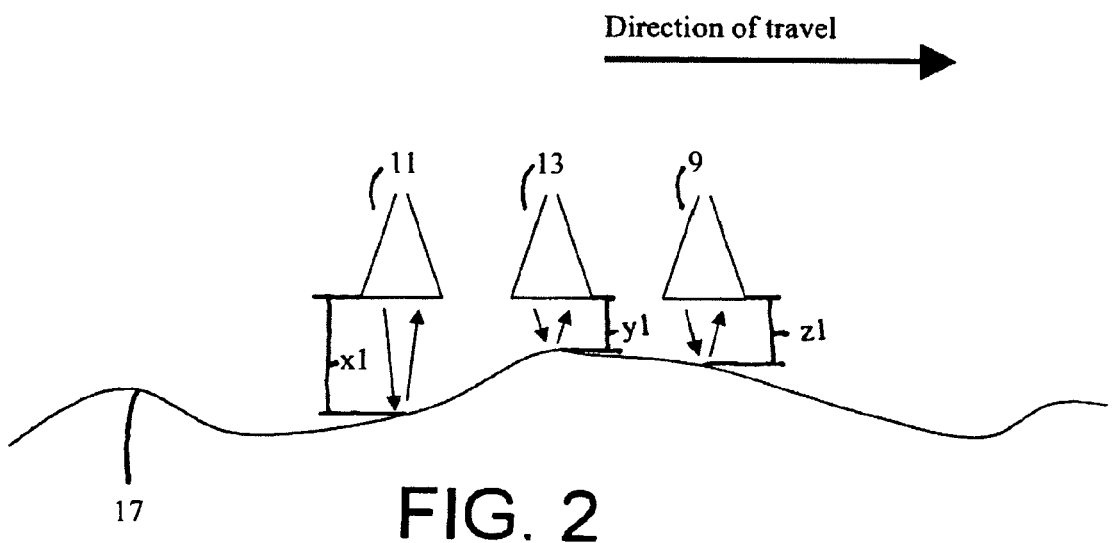
FIG. 2 depicts a side view of an embodiment of the invention.

FIG. 2 depicts a side view of a preferred embodiment of the invention. The linear array element, 13, is flanked by the fore element, 9, and the aft element 11. The elements detect their respective distances from the undulating ground 17 below. The distances between the 11, 13, and 9 elements and the ground are x1, y1, and z1, respectively. Radar travels from the transmitter of each element to the ground 17 and back to the receiver of each element as illustrated by the arrows. The elements are initially level. A B-scan of data is acquired from the array in its current position. The array travels some arbitrary distance in the direction of travel before a second B-scan is acquired.

Figure 3:
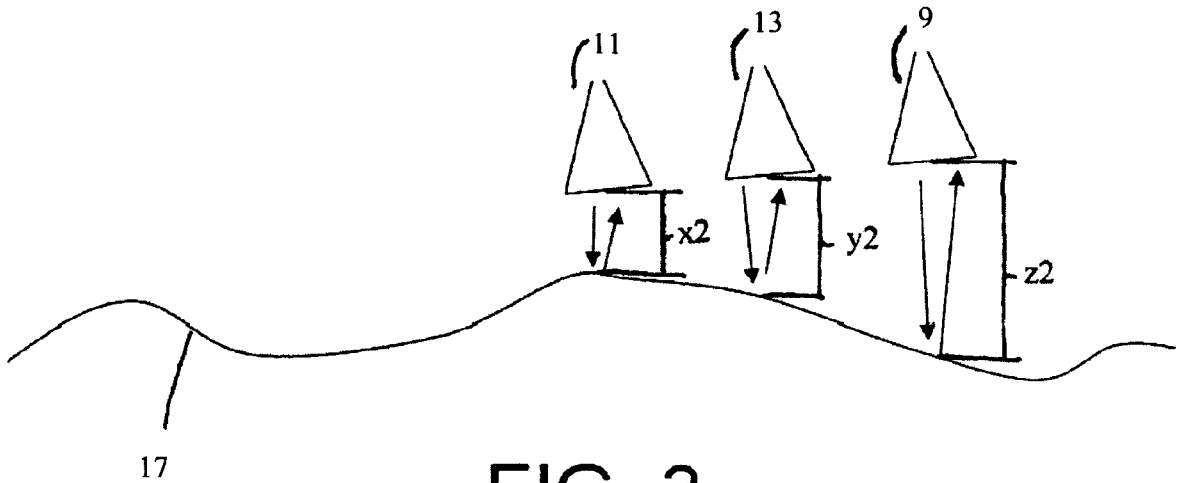
FIG. 3 depicts a side view of an embodiment of the invention after traveling some distance.

FIG. 3 shows a side view of a preferred embodiment of the invention after traveling this arbitrary distance. It order to simplify the equations, let this distance of travel be equal to the spacing between elements such that element 11 is now directly over where 13 used to be and 13 is directly over where 9 used to be. The array's elevation and orientation may have changed. The distances between the 11, 13, and 9 elements and the ground are now x2, y2, and z2, respectively. Δx is the change in elevation of element 11 between the figure one and figure two positions, Δy is the change in elevation of 13, and finally Δz is the change in elevation of element 9, all excluding the change in ground elevation. Therefore:

$$\Delta x = x_2 - y_1$$

$$\Delta y = y_2 - z_1$$

$$\Delta z = 2\Delta y - \Delta x$$
$$= 2y_2 - 2z_1 - x_2 + y_1$$

Each of these correction factors can be applied to the range data returned from each element in the array. The data will then be normalized to appear as if the array did not change orientation or elevation. When the array moves forward to the next location, the same method can be repeated using the corrected values of this position as the prior position data. In this manner all further down-track positions can be corrected so as to appear as if the array maintains a constant elevation and orientation throughout the traversal of the array.

One assumption of this particular method of correction is that the linear array is initially at the correct height and at a perfectly level orientation. Any deviations from a level orientation will result in a systematic and gradual drift of the corrected height over down-track locations. However, this drift can be detected and compensated for as the down-track collection continues.

This model also assumes that each element will detect its range to the ground directly beneath it. This is only accurate for small changes in orientation. Large changes result in the elements pointed towards ground that is not directly underneath them. For scenarios where this approximation is unacceptable, a more complex model can be applied to derive the correction values.

The invention is described in the context of a ground penetrating radar array for the purposes of subsurface target detection, classification, and/or imaging. However, this method can be applied to any sensor array which desires to accurately map the contour of the ground. Furthermore, a mixture of sensors can be used. For example, a linear array of elements 7-13 could be realized using GPR transceivers while ABCD could be LADAR or ultrasound.

Figure 4:
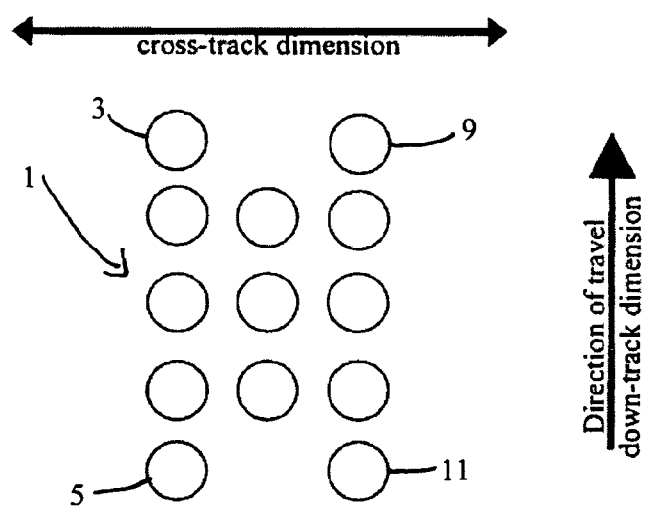
FIG. 4 is a diagram depicting an array of elements in the form of a planar array.

A similar method of ground tracking could be implemented using a planar array. FIG. 4 depicts the array of elements 1 in the form of a planar array. However, the additional elements used in creating a planar array would add complexity, and potentially reduce system performance (speed, signal to noise ratio, etc.) without providing any marginal improvement over the described invention in terms of reliability of ground-tracking.

Figure 5:
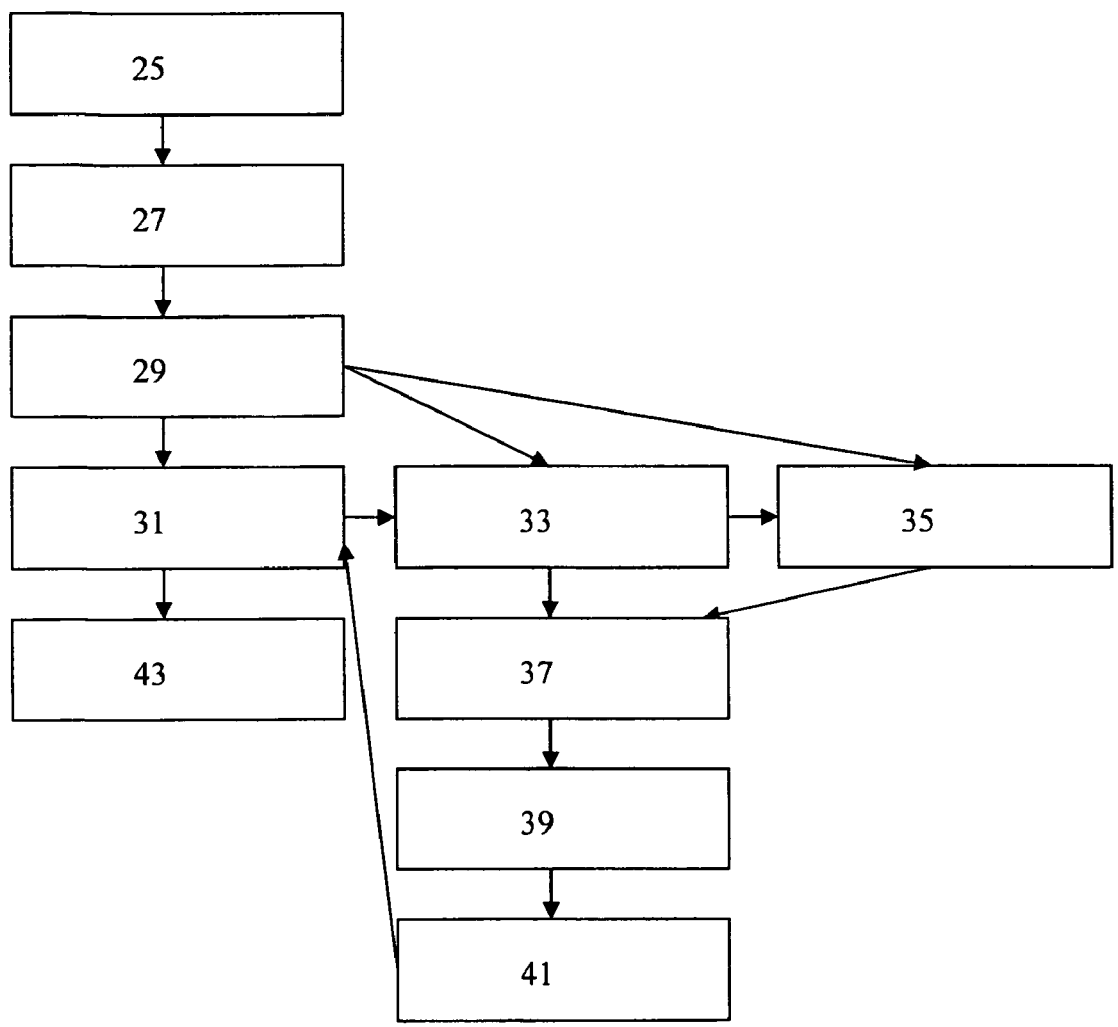
FIG. 5 is a diagram illustrating a method of mapping ground contours.

FIG. 5 is a diagram illustrating a new method of mapping ground contours. A movable ground structure is provided 25. First sensor elements are provided in an array attached to the movable structure 27. Second sensor elements are provided fore and aft of the array 29. The movable structure is then linearly traversed over an area of ground 31, and during that traverse data is periodically gathered 33 and distances between the second sensor elements and the ground are detected 35. A change in elevation and orientation of the first sensor elements is determined 37 based on data gathered by the first sensor elements and distances detected by the second sensor elements. The data gathered is normalized 39 to remove the effect of changes in elevation or orientation of the first sensor elements and stored 41. After some ground has been traversed and some data has been gathered, a three-dimensional image of a ground surface is created 43 using the normalized data.

Figure 6:
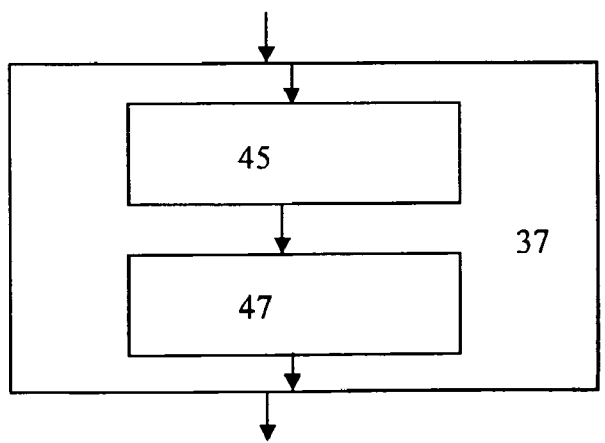
FIG. 6 is a diagram illustrating a method of determining a change in elevation and orientation of first sensor elements.

FIG. 6 is a diagram illustrating one embodiment of determining a change in elevation and orientation of the first sensor elements 37. This step may include determining the change in elevation of end first sensor elements due to changes in the array and not due to ground variation 45 and determining the change in elevation of first sensor elements other than the end first sensor elements by taking a linear combination of the changes in elevation of each of the end first sensor elements 47.

While the invention has been described with reference to specific embodiments, modifications and variations of the invention may be constructed without departing from the scope of the invention.

We claim:

1. A ground contour mapping array, comprising:
a ground-based movable structure traversable over a ground area to be mapped,
an array of sensor elements attached to the movable structure,
additional sensor elements fore and aft of the array for detecting changes in elevation and orientation of the array to prevent distortion of data gathered by the array, and
electronic means for adjusting the data from the sensor array to remove the effect of changes in the elevation or orientation of the sensor array.

2. The ground contour mapping array of claim 1, wherein the array is traversed along a downtrack direction and the array is attached along a cross-track perpendicular to the down-track direction.

3. A method of mapping ground contours, comprising:
providing a ground-based movable structure, providing first sensor elements in an array attached to the movable structure,
providing second sensor elements fore and aft of the array,
linearly traversing the movable structure over an area of ground, gathering data periodically from the first sensor elements while the movable structure traverses the area of ground,
detecting distances between the second sensor elements and the ground at the same time as data is gathered from the first sensor elements,
determining a change in elevation and orientation of the first sensor elements based on data gathered by the first sensor elements and distances detected by the second sensor elements,
normalizing the data gathered from the first sensor elements to remove the effect of changes in the elevation or orientation of the first sensor elements,
storing the normalized data, and
creating a 3-dimensional image of a ground surface using the normalized data.

4. The ground contour mapping array of claim 3, wherein the array of sensor elements is a linear array.

5. The ground contour mapping array of claim 3, wherein the array of sensor elements is an array of ground penetrating radar elements.

6. The ground contour mapping array of claim 5, wherein the additional second sensor elements are LADAR or ultrasound.

7. The ground contour mapping array of claim 5, wherein the second sensor elements are ground penetrating radar elements, each consisting of a transmitter and receiver pair.

8. The ground contour mapping array of claim 3, wherein the array of sensor elements is a planar array.

9. The ground contour mapping array of claim 3, wherein the second sensor elements are placed fore and aft of sensor elements near opposite ends of the array.

10. The ground contour mapping array of claim 3, further comprising a processor and a memory operatively coupled to the processor, wherein the processor adjusts the data gathered by the array according to the changes in elevation and orientation detected with the second sensor elements and the memory records the adjusted data.

11. The ground contour mapping array of claim 3, wherein the sensor elements of the array of sensor elements are mounted rigidly with respect to one another, such that the distance between them is always the same.

12. The method of mapping ground contours of claim 3, wherein the providing second sensor elements fore and aft of the array comprises providing second sensor elements fore and aft of first sensor elements at opposite ends of the array that are first and last sensor elements in the array in a direction perpendicular to a direction of motion.

13. The method of mapping ground contours of claim 12, wherein the determining a change in elevation and orientation of the first sensor elements based on data gathered by the first sensor elements and distances detected by the second sensor elements comprises determining the change in elevation of the end first sensor elements due to changes in the array and not due to ground variation, based on the distance between the first sensor elements at opposite ends of the array and the ground and the distance between each of the second sensor elements and the ground at the present position and at least one previous position, and determining the change in elevation of the first sensor elements other than the first sensor elements at opposite ends of the array due to changes in the array and not due to ground variation by taking a linear combination of the changes in elevation of each of the end first sensor elements due to changes in the array and not due to ground variation.

14. The method of mapping ground contours of claim 13, wherein the distance between the first sensor elements at opposite ends of the array and the ground and the distance between each of the second sensor elements and the ground at least one previous position are normalized to remove the effect of changes in the elevation or orientation of the first and second sensor elements at the previous position.

15. The method of mapping ground contours of claim 13, wherein the determining the change in elevation of the first sensor elements near opposite ends of the array due to changes in the first sensor elements and not due to ground variation comprises comparing a distance measured between a first or second sensor element and the ground and a distance measured between another first or second sensor element and the ground, wherein the first or second sensor element and the another first or second sensor element were each above the same location on the ground when the measurements were taken.

16. The method of mapping ground contours of claim 12, wherein the gathering data periodically comprises gathering data from the first sensor elements each time the movable structure traverses a distance equal to a given percentage of the distance between the end first sensor elements and the second sensor elements fore and aft of the first sensor elements at opposite ends of the array.

17. The method of mapping ground contours of claim 16, wherein the given percentage is 100%.

18. The method of mapping ground contours of claim 3, wherein the first or second sensor elements are ground penetrating radar elements, each consisting of a transmitter and receiver pair.

19. The method of mapping ground contours of claim 3, wherein the first and second sensor elements are mounted rigidly with respect to one another, such that the distance between them is always the same.

20. The method of claim 3, wherein the traversing further comprises traversing the array along a down-track direction and providing the array along a cross-track perpendicular to the down-track direction.

* * * * *